(12) United States Patent
Yamashita et al.

(10) Patent No.: US 11,500,381 B2
(45) Date of Patent: Nov. 15, 2022

(54) STOPPING POSITION CONTROL DEVICE, STOPPING POSITION CONTROL METHOD, AND COMPUTER PROGRAM FOR STOPPING POSITION CONTROL

(71) Applicant: TOYOTA JIDOSHA KABUSHIKI KAISHA, Toyota (JP)

(72) Inventors: Keiji Yamashita, Nisshin (JP); Koichi Ikemoto, Nagoya (JP); Koji Taguchi, Sagamihara (JP); Shin Sakurada, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 16/587,171

(22) Filed: Sep. 30, 2019

(65) Prior Publication Data

US 2020/0159217 A1 May 21, 2020

(30) Foreign Application Priority Data

Nov. 21, 2018 (JP) .............................. JP2018-218018

(51) Int. Cl.
*B60W 40/08* (2012.01)
*G05D 1/00* (2006.01)
*G08G 1/133* (2006.01)

(52) U.S. Cl.
CPC .......... *G05D 1/0088* (2013.01); *B60W 40/08* (2013.01); *G08G 1/133* (2013.01); *B60W 2040/0881* (2013.01); *B60W 2554/00* (2020.02); *G05D 2201/0212* (2013.01)

(58) Field of Classification Search
None
See application file for complete search history.

(56) References Cited

U.S. PATENT DOCUMENTS

| | | | |
|---|---|---|---|
| 2003/0208298 A1* | 11/2003 | Edmonds | B07C 3/00 700/224 |
| 2008/0004995 A1* | 1/2008 | Klingenberg | G06Q 10/083 705/28 |
| 2017/0316701 A1* | 11/2017 | Gil | B64D 45/04 |
| 2018/0136656 A1* | 5/2018 | Rasmusson, Jr. | G06K 9/00791 |
| 2019/0103028 A1 | 4/2019 | Kobayashi et al. | |
| 2019/0197325 A1* | 6/2019 | Reiley | G08B 21/24 |
| 2020/0009965 A1* | 1/2020 | Webb | B62D 25/20 |
| 2020/0039387 A1* | 2/2020 | Umetani | B60N 2/002 |

FOREIGN PATENT DOCUMENTS

| | | | |
|---|---|---|---|
| JP | 2001261123 A | * | 9/2001 |
| JP | 2017-124802 A | | 7/2017 |
| JP | 2017-182137 A | | 10/2017 |

* cited by examiner

*Primary Examiner* — James M McPherson
(74) *Attorney, Agent, or Firm* — Sughrue Mion, PLLC (57) ABSTRACT

A stopping position control device according to an embodiment includes a sitting position specifying unit configured to specify a sitting position of a user who gets off a vehicle next, the vehicle being subjected to automatic driving control, and a stopping position determination unit configured to determine a stopping position of the vehicle, at which the user gets off the vehicle, corresponding to the sitting position of the user.

9 Claims, 6 Drawing Sheets

FIG. 7 ical Field

The disclosure relates to a stopping position control device, a stopping position control method, and a computer program for stopping position control.

2. Description of Related Art

In recent years, an automatic driving technique for a vehicle is being developed to realize a mobility service such as a taxi service, a bus service, or a ridesharing service which uses a vehicle subjected to automatic driving control.

For example, a demand responsive operation system described in Japanese Unexamined Patent Application Publication No. 2017-182137 (JP 2017-182137 A) is a demand responsive operation system including a user terminal, a demand vehicle that operates based on a use request from the user terminal, and an operation management center that manages operation of the demand vehicle, the user terminal, the demand vehicle, and the operation management center being connected to each other such that information can be communicated therebetween. The operation management center includes a use reception unit that receives the use request from the user terminal and an operation plan generation unit that generates an operation plan allowable according to a reference operation planning diagram based on the use request received by the user reception unit and the reference service planning diagram in which an operation section, a starting point departure time, and an end point arrival time are set in advance and provides the generated operation plan to the demand vehicle and the user terminal. The user terminal shows a user the operation plan provided by the operation plan generation unit to and the demand vehicle operates in accordance with the operation plan provided by the operation plan generation unit.

SUMMARY

However, although depending on a stopping position, it may be difficult for a user to get off a vehicle while the vehicle is stopped at a boarding and alighting point.

The disclosure provides a stopping position control device that makes it easy for a user to get off a vehicle.

A first aspect of the disclosure relates to a stopping position control device including a sitting position specifying unit and a stopping position determination unit. The sitting position specifying unit is configured to specify a sitting position of a user who gets off a vehicle next, the vehicle being subjected to automatic driving control. The stopping position determination unit is configured to determine a stopping position of the vehicle, at which the user gets off the vehicle, corresponding to the sitting position of the user.

The stopping position control device according to the first aspect of the disclosure further includes a storage unit and a sitting position registration unit. The storage unit is configured to store information about a boarding place at which the user gets on the vehicle and a destination at which the user gets off the vehicle. The sitting position registration unit is configured to register a sitting position that enters a seated state when the user gets on the vehicle at the boarding place of the user in the storage unit in association with the destination of the user. The sitting position specifying unit specifies, as the sitting position of the user who gets off the vehicle at the destination of the user, the sitting position that is registered in the storage unit in association with the destination of the user.

In the stopping position control device according to the first aspect of the disclosure, the vehicle may include a plurality of doors. The stopping position control device may further include a door selection unit configured to select, based on the sitting position of the user, a boarding and alighting door via which the user gets off the vehicle from among the doors. The stopping position determination unit may determine the stopping position corresponding to the position of the boarding and alighting door.

In the stopping position control device according to the first aspect of the disclosure, the stopping position determination unit may determine, as the stopping position, a position at which no obstacle inhibiting the user from getting off the vehicle via the boarding and alighting door is present within a certain area outward of the boarding and alighting door of the vehicle.

In the stopping position control device according to the first aspect of the disclosure, the stopping position determination unit may determine the stopping position based on map data including information about the position of the obstacle present within a certain area around a destination of the user.

In the stopping position control device according to the first aspect of the disclosure, the stopping position determination unit may determine, based on map data including information about the position of predetermined lighting equipment present within a certain area around a destination of the user, a position within a predetermined area around the position of the lighting equipment as the stopping position in a case where the user gets off the vehicle during a predetermined period of time.

In the stopping position control device according to the first aspect of the disclosure, the stopping position determination unit may determine, based on information about the traffic volume of a road within a certain area around a destination of the user which is received via a traffic information receiver, a position with a predetermined traffic volume or less as the stopping position.

A second aspect of the disclosure relates to a sitting position control method. The stopping position control method includes specifying a sitting position of a user who gets off a vehicle next, the vehicle being subjected to automatic driving control, and determining a stopping position of the vehicle, at which the user gets off the vehicle, acorresponding to the sitting position of the user.

A third aspect of the disclosure relates to a computer program for stopping position control. The computer program causes a processor to specify a sitting position of a user who gets off a vehicle next, the vehicle being subjected to automatic driving control, and determine a stopping position of the vehicle, at which the user gets off the vehicle, corresponding to the sitting position of the user.

A fourth aspect of the disclosure relates to a stopping position control device including a sitting position specifying unit and a stopping position determination unit. The sitting position specifying unit is configured to specify a sitting position on which a user who gets on a vehicle next sits, the vehicle being subjected to automatic driving control. The stopping position determination unit is configured to determine a stopping position of the vehicle, at which the user gets on the vehicle, corresponding to the sitting position of the user.

The stopping position control device according to the aspects of the disclosure can make it easy for a user to get off a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A stopping position control device according to an aspect of the disclosure determines, based on a sitting position of a user who gets off a vehicle next, a stopping position of the vehicle such that the user easily gets off the vehicle, the vehicle being subjected to automatic driving control.

Accordingly, the stopping position control device according to the aspect of the disclosure can make it easy for a user to get off a vehicle.

Hereinafter, a preferred embodiment will be described with reference to drawings. Note that, the disclosure is not limited to the following embodiments and modification can be appropriately made without departing from the spirit of the disclosure. In addition, components having the same or equivalent functions are given the same reference numerals and description thereof will be omitted or simplified.

Figure 1:
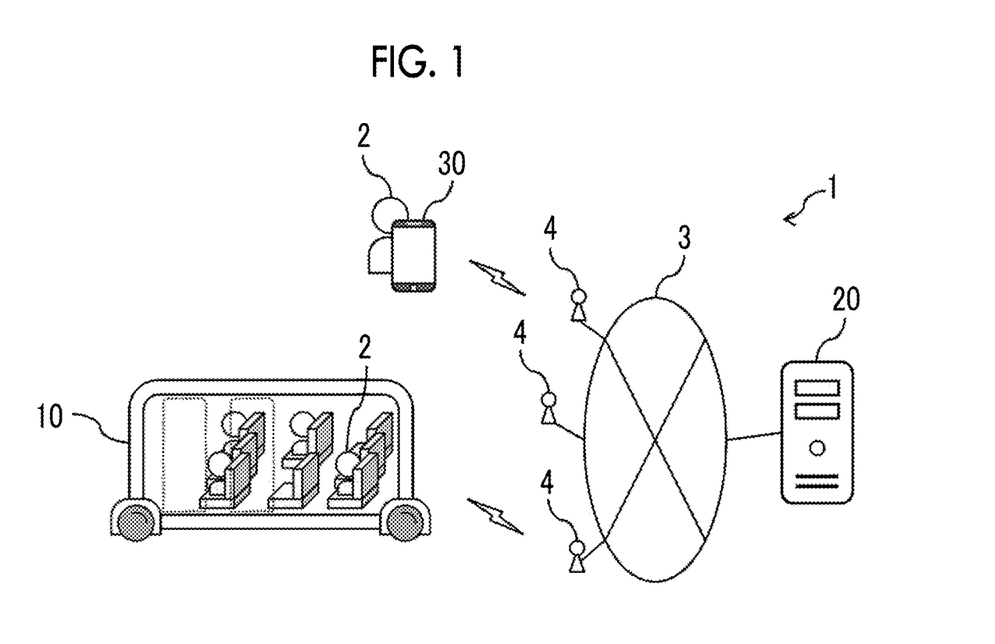
FIG. 1 is a diagram illustrating an example of the configuration of a vehicle operation system including a stopping position control device according to an embodiment.

FIG. 1 is a diagram illustrating an example of the configuration of a vehicle operation system 1 including a stopping position control device according to an embodiment. The vehicle operation system 1 in the embodiment includes a vehicle 10, a server 20, and a portable terminal 30.

The vehicle 10 shown in FIG. 1 is an automatically driven vehicle that provides a mobility service such as a taxi service, a bus service, or a ridesharing service. The vehicle 10 includes a plurality of doors and a plurality of seats and one or more users 2 using the mobility service can get on the vehicle 10.

The user 2 who wants to use the mobility service provided by the vehicle 10 and is on the outside of the vehicle can request the server 20 to allocate the vehicle 10 by operating the portable terminal 30 possessed by the user 2.

When the server 20 receives a vehicle allocation request from the portable terminal 30 of the user 2 who wants to user the mobility service, the server 20 transmits a vehicle allocation instruction to the vehicle 10.

When the vehicle 10 receives the vehicle allocation instruction from the server 20, the vehicle 10 moves to a boarding place at which the user 2 gets on the vehicle and after the user 2 gets on the vehicle, the vehicle 10 moves to a destination at which the user 2 gets off the vehicle. The vehicle 10 determines a stopping position such that the user 2 easily gets off the vehicle 10 at the destination of the user 2 and is stopped at the determined stopping position.

The vehicle 10, the server 20, and the portable terminal 30 can communicate with each other via a network 3 including an optical communication line or the like. The server 20 is connected to the network 3 via a gateway (not shown) or the like, for example. In addition, the vehicle 10 and the portable terminal 30 are connected to the network 3 via a wireless base station 4 or the like that is connected to the network 3 via a gateway (not shown) or the like, for example.

Figure 2:
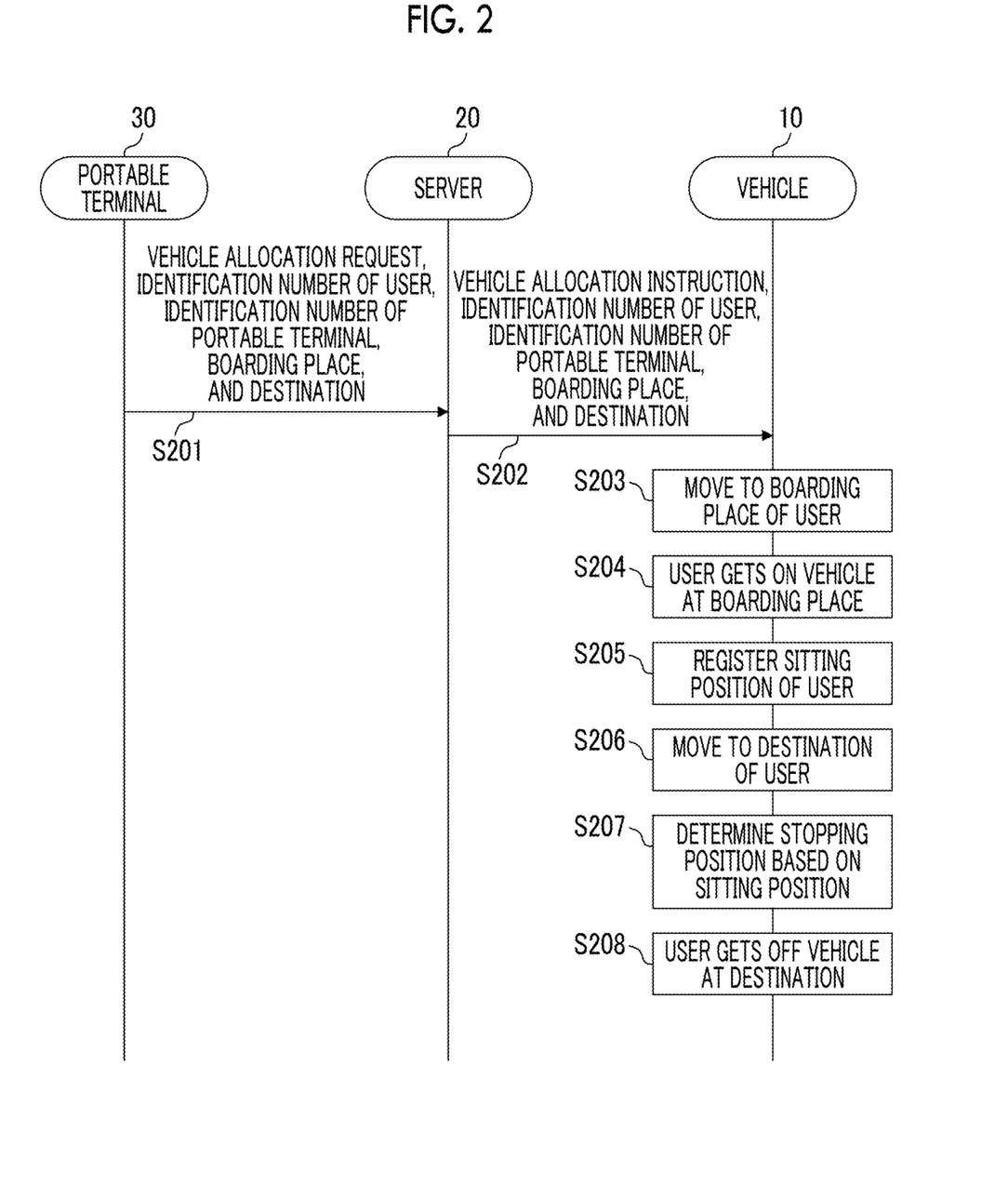
FIG. 2 is a sequence diagram illustrating an example of a stopping position control process of stopping a vehicle at a destination of a user.

FIG. 2 is a sequence diagram illustrating an example of a stopping position control process of stopping the vehicle 10 at the destination of the user 2. In the sequence diagram shown in FIG. 2, communication between the server 20, the vehicle 10, and the portable terminal 30 is performed via the network 3.

The server 20 receives the vehicle allocation request, information for identification of the user 2 such as an identification number of the user 2 or an identification number of the portable terminal 30, and information about the boarding place, the destination, or the like from the portable terminal 30 of the user 2 who wants to use the mobility service (step S201). The identification number of the user 2 is a user number that is assigned to the user 2 of the mobility service in advance, for example. In addition, the identification number of the portable terminal 30 is a telephone number of the portable terminal 30, for example. In addition, the information about the boarding place and the destination is designated by means of a combination of a facility name, an address, a longitude, and a latitude, for example.

Next, the server 20 detects the vehicle 10 present within a certain area around the boarding place where the user 2 waits for allocation of the vehicle and selects the vehicle 10 that can be allocated from at least one detected vehicle 10. Then, the server 20 transmits the vehicle allocation instruction, the information for identification of the user 2, and the information about the boarding place, the destination, and the like to the vehicle 10 (step S202). In a case where the vehicle 10 provides a ridesharing service or the like, there is a possibility that another user has already got on the vehicle 10. In this case, the server 20 may select the vehicle 10 from the at least one detected vehicle 10 such that the destination of the other user got on the vehicle 10 is in the same direction as that of the user 2.

In a case where the seat assignment system for the vehicle 10 is a reserved-seat system, the server 20 assigns one of the seats of the vehicle 10 to the user 2. The server 20 transmits a reserved seat number indicating the seat assigned to the user 2 to each of the vehicle 10 and the portable terminal 30 of the user 2. The reserved seat number is displayed on a display device or the like installed in the vehicle 10 along with a disposition diagram of the seat indicated by the reserved seat number or is written on a backrest or the like of the seat indicated by the reserved seat number. Accordingly, when getting on the vehicle 10, the user 2 can find the seat in the vehicle 10 that is assigned to the user 2 by comparing a reserved seat number that is displayed on a display unit of the portable terminal 30 and is received from the server 20 with a reserved seat number that is displayed on the display device of the vehicle 10 or written on the seat.

When the vehicle 10 receives the vehicle allocation instruction from the server 20, the vehicle 10 moves to the boarding place at which the user 2 waits for allocation of the vehicle (step S203).

When the vehicle 10 arrives at the boarding place of the user 2, the doors of the vehicle 10 are opened and closed such that the user 2 gets on the vehicle 10 (step S204). When the vehicle 10 detects that the user 2 has got on the vehicle 10 at the boarding place of the user 2 by using a sitting sensor or the like, a sitting position in the vehicle 10 that is in a seated state is registered, as a sitting position of the user 2, in a storage unit in association with the destination of the user 2 (step S205).

Next, the vehicle 10 moves to the destination of the user 2 along a traveling route of the vehicle 10 from the current location of the vehicle 10 to the destination of the user 2, the traveling route being generated by a car navigation system (not shown) installed in the vehicle 10, for example (step S206).

When the vehicle 10 arrives at the destination, the vehicle 10 determines, based on the sitting position of the user 2, the stopping position of the vehicle 10 at which the user 2 gets off the vehicle 10 such that the user 2 easily gets off the vehicle 10 (step S207). For example, in a case where the sitting position of the user 2 is on a rear side of the vehicle 10, the vehicle 10 determines the stopping position of the vehicle 10 at which no obstacle is present outward of a rear side door of the vehicle 10 such that the user 2 easily gets off the vehicle 10 via the rear side door of the vehicle 10. Then, the vehicle 10 opens and closes the rear side door of the vehicle 10 such that the user 2 gets off the vehicle 10 (step S208). Accordingly, the user 2 easily gets off the vehicle 10.

Figure 3:
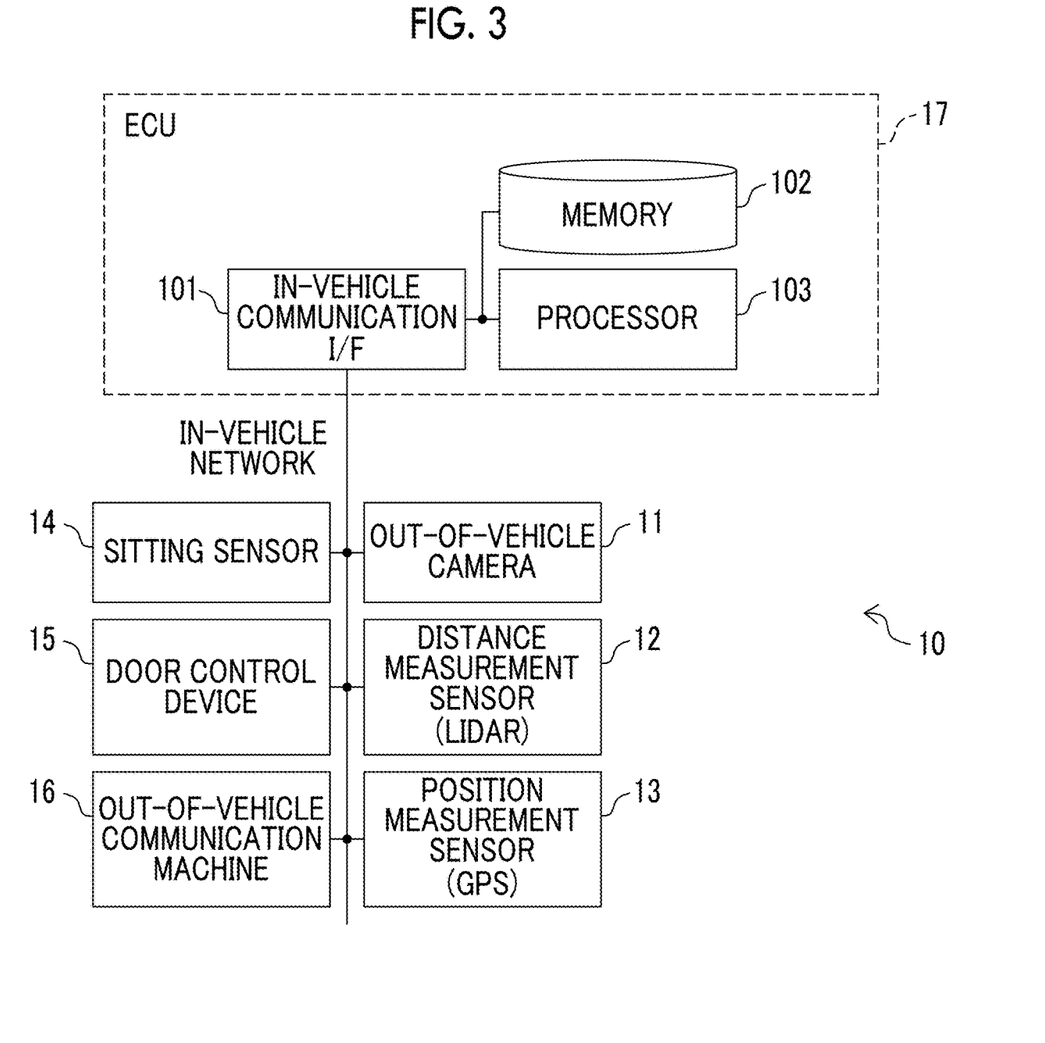
FIG. 3 is a hardware configuration diagram of the vehicle.

FIG. 3 is a hardware configuration diagram of the vehicle 10. The vehicle 10 includes an out-of-vehicle camera 11, a distance measurement sensor 12, a position measurement sensor 13, a sitting sensor 14, a door control device 15, an out-of-vehicle communication machine 16, and an electronic control unit (ECU) 17 which are connected to each other via an in-vehicle network. The in-vehicle network is, for example, a network conforming to a controller area network (CAN) standard.

The out-of-vehicle camera 11 images a road, an object, and a person around the vehicle 10 and outputs a captured video to the ECU 17. The videos of the road, the object, and the person captured by the out-of-vehicle camera 11 are used for the ECU 17 to automatically control the driving of the vehicle 10 and are used for the ECU 17 to determine the stopping position of the vehicle 10 at the destination of the user 2. A plurality of the out-of-vehicle cameras 11 may be disposed in the vehicle. For example, the out-of-vehicle camera 11 is disposed close to a windshield of the vehicle 10 or at a position in the vehicle 10 at which the out-of-vehicle camera 11 can capture an image in a lateral direction of the vehicle 10 and is disposed while facing the outside of the vehicle such that a road, an object, and a person around the vehicle 10 are clearly imaged.

The distance measurement sensor 12 measures a distance to an object present around the vehicle 10 for each cardinal direction and outputs a measurement value of the distance to the ECU 17. The measurement value of the distance obtained by the distance measurement sensor 12 is used for the ECU 17 to automatically control the driving of the vehicle 10 and is used for the ECU 17 to determine the stopping position of the vehicle 10 at the destination of the user 2. For example, the distance measurement sensor 12 is disposed at a position in the vehicle 10 at which the distance measurement sensor 12 can measure the distance to the object present around the vehicle 10 and is disposed while facing the outside of the vehicle such that the distance to the object present around the vehicle 10 is accurately measured. The distance measurement sensor 12 is, for example, a light detection and ranging (LIDAR) sensor installed in the vehicle 10.

The position measurement sensor 13 generates position information indicating the current location of the vehicle 10 and outputs the position information to the ECU 17. The position information generated by the position measurement sensor 13 is used for the ECU 17 to automatically control the driving of the vehicle 10 and is periodically transmitted to the server 20 via the network 3 such that the server 20 can grasp the current location of the vehicle 10. The position measurement sensor 13 is, for example, a global positioning system (GPS) receiver of a car navigation system installed in the vehicle 10.

The sitting sensor 14 outputs a sitting signal, which indicates whether each sitting position in the vehicle 10 is in a seated state or not, to the ECU 17. For example, the sitting sensor 14 may be a pressure sensor that outputs the sitting signal when detecting that the sitting pressure on a sitting position in the vehicle 10 that is applied by the user 2 sitting on the sitting position exceeds a predetermined threshold value. Alternatively, the sitting sensor 14 may be an optical sensor that outputs the sitting signal when detecting that an infrared ray emitted toward a sitting position in the vehicle 10 is blocked or reflected by the body of the user 2 sitting on the sitting position. Alternatively, the sitting sensor 14 may be a pyroelectric sensor that outputs the sitting signal when detecting that the amount of infrared ray radiated from the body of the user 2 sitting on a sitting position in the vehicle 10 exceeds a predetermined threshold value.

The door control device 15 controls the opening and closing and the locking and unlocking of each of the doors of the vehicle 10 in accordance with a door control signal output from the ECU 17. In addition, the door control device 15 may be configured to receive a door control signal transmitted from the server 20 via the out-of-vehicle communication machine 16 and control the opening and closing and the locking and unlocking of each of the doors of the vehicle 10 in accordance with the door control signal.

The out-of-vehicle communication machine 16 includes an antenna and a signal processing circuit that performs various processes related to wireless communication such as modulation and demodulation of a radio signal, for example. The out-of-vehicle communication machine 16 receives a downlink radio signal from the wireless base station 4 which is connected to the network 3 via the gateway or the like and transmits an uplink radio signal to the wireless base station 4. That is, the out-of-vehicle communication machine 16 extracts a signal transmitted from the server 20 to the vehicle 10 from the downlink radio signal that is received from the wireless base station 4 and sends the signal to a processor 103. Specifically, the out-of-vehicle communication machine 16 extracts the vehicle allocation instruction, the information for identification of the user 2, and the information about the boarding place, the destination, and the like, which are transmitted from the server 20 to the vehicle 10 as shown in FIG. 2, from the radio signal and sends the vehicle allocation instruction, the information for identification of the user 2, and the information about the boarding place, the destination, and the like to the processor 103. In addition, the out-of-vehicle communication machine 16 generates the uplink radio signal including a signal transmitted to the server 20 that is received from the processor 103 and transmits the radio signal.

Furthermore, the out-of-vehicle communication machine 16 may be configured such that the ECU 17 of the vehicle 10 can directly communicate with the portable terminal 30 of the user 2 not via the network 3 by using short-range wireless communication such as Bluetooth (registered trademark), for example.

The ECU 17 determines a vehicle stopping point of the vehicle 10 such that the user 2 easily gets off the vehicle 10 at the destination of the user 2 and performs automatic driving control of the vehicle 10 such that the vehicle 10 is stopped at the determined vehicle stopping point.

The ECU 17 includes an in-vehicle communication interface (I/F) 101, a memory 102, and the processor 103 which are connected to each other via a signal line. The in-vehicle communication I/F 101 is a communication I/F circuit used for the ECU 17 to communicate with other in-vehicle machines of the vehicle 10 via the in-vehicle network.

The memory 102 is an example of the storage unit. The memory 102 includes a storage medium such as a semiconductor memory and stores a computer program executed by the processor 103. In addition, the memory 102 stores the information for identification of the user 2 and the information about the boarding place, the destination, and the like which are received from the server 20. In addition, the memory 102 may store a table showing a correspondence relationship between each sitting position in the vehicle 10 and a door that is used when a user on the sitting position gets on or off the vehicle 10 (for example, table showing door closest to each sitting position in vehicle 10). The table may include information showing another sitting position present on a route from each sitting position in the vehicle 10 to each door of the vehicle 10, information showing an ascending order of distances from a sitting position to doors available from the sitting position, for each sitting position in the vehicle 10, and the like.

In addition, the memory 102 may store map data or the like to which the ECU 17 refers to determine the stopping position of the vehicle 10 at the destination of the user 2. The map data may include, for example, information about the position or the three-dimensional structure of a predetermined obstacle such as a guardrail or an electric pole and information about the position of predetermined lighting equipment such as a street light or a billboard light.

The processor 103 is one or more CPUs executing a computer program for the stopping position control process performed in the ECU 17 and a circuit in the vicinity of the one or more CPUs.

Figure 4:
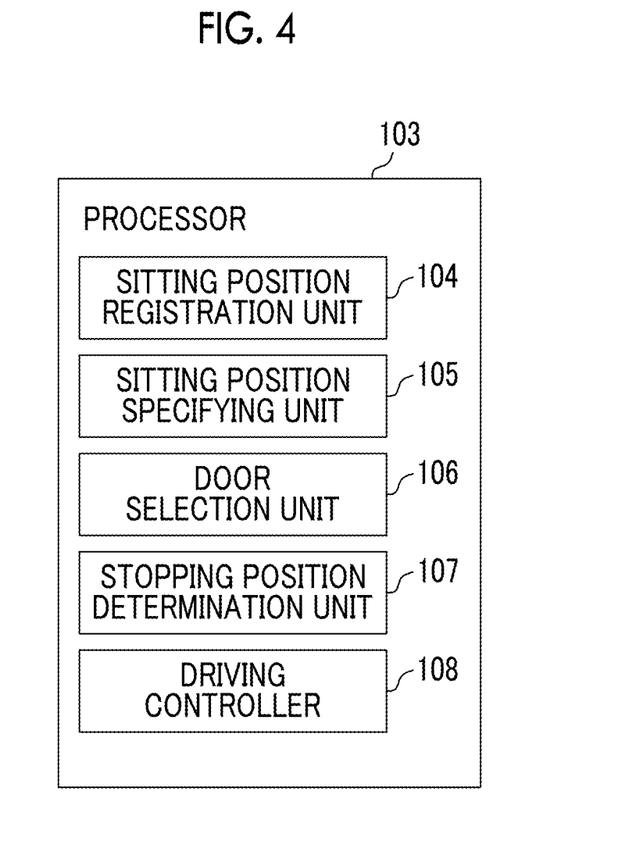
FIG. 4 is a functional block diagram of a processor of an ECU of the vehicle.

FIG. 4 is a functional block diagram of the processor 103 of the ECU 17 of the vehicle 10. The processor 103 includes a sitting position registration unit 104, a sitting position specifying unit 105, a door selection unit 106, a stopping position determination unit 107, and a driving controller 108. Each of the units is, for example, a software module realized by the computer program executed on the processor 103. In addition, each of the units may be mounted as firmware executed by the processor 103 and may be realized as a calculation circuit formed in an FPGA or an ASIC.

The sitting position registration unit 104 registers a sitting position that enters a seated state when the user 2 gets on the vehicle 10 at the boarding place of the user 2 in the memory 102 in association with the destination of the user 2. In addition, the sitting position specifying unit 105 specifies the sitting position registered by the sitting position registration unit 104 as the sitting position of the user 2 who gets off the vehicle 10 at the destination of the user 2. In addition, the door selection unit 106 selects a boarding and alighting door via which the user 2 gets off the vehicle 10 based on the sitting position of the user 2. In addition, the stopping position determination unit 107 determines the stopping position corresponding to the position of the boarding and alighting door. In addition, the driving controller 108 performs automatic driving control of the vehicle 10 such that the vehicle 10 is stopped at the determined stopping position. Hereinafter, each of the units will be described in more detail.

When the sitting sensor 14 of the vehicle 10 detects that one of the sitting positions in the vehicle 10 has entered a seated state at the boarding place, the sitting position registration unit 104 determines that the user 2 who gets on the vehicle 10 at the boarding place has sat on the sitting position in the seated state while referring to the information about the boarding place, the destination, and the like of the user 2 which is received from the server 20 in advance. Then, the sitting position registration unit 104 registers the sitting position, about which a determination has been made that the user 2 has sat on the sitting position, in the memory 102 as the sitting position of the user 2 in association with the destination of the user 2.

Thereafter, there is a change in sitting position of the user 2, the sitting position registration unit 104 registers the new sitting position of the user 2 in the memory 102 in association with the destination of the user 2. Specifically, when the sitting sensor 14 detects that the sitting position registered as the sitting position of the user 2 has exited the seated state and then another sitting position has newly entered a seated state, the sitting position registration unit 104 registers the new sitting position in the seated state in the memory 102 as the new sitting position of the user 2.

In addition, in a case where the seat assignment system for the vehicle 10 is a reserved-seat system, the sitting position registration unit 104 registers a sitting position in the vehicle 10 that corresponds to a reserved seat number, which is received from the server 20 in advance, in the memory 102 as the sitting position of the user 2 in association with the destination of the user 2. The user 2 who gets on the vehicle 10 at the boarding place compares a reserved seat number that is displayed on the portable terminal 30 and is received from the server 20 as described above with a reserved seat number that is displayed on the display device of the vehicle 10 or written on a seat in the vehicle 10 and sits on the registered sitting position.

Figure 5:
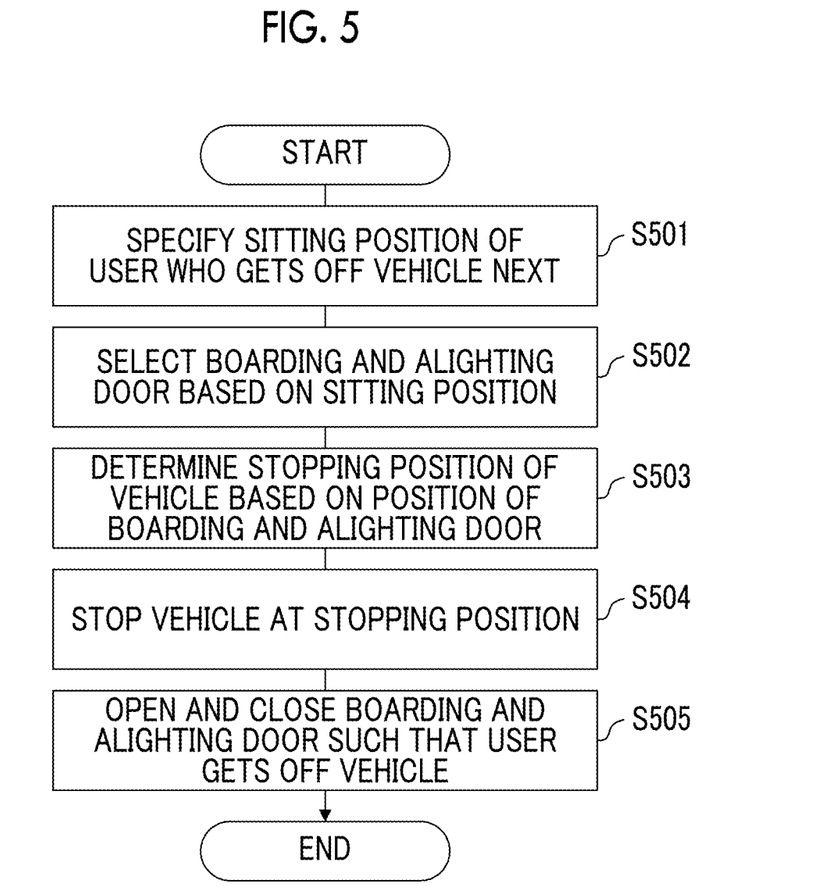
FIG. 5 is a flowchart illustrating an example of the stopping position control process in the ECU of the vehicle.

FIG. 5 is a flowchart illustrating an example of the stopping position control process in the ECU 17 of the vehicle 10. The sitting position specifying unit 105, the door selection unit 106, the stopping position determination unit 107, and the driving controller 108 of the ECU 17 perform the stopping position control process, which makes it easy for the user 2 to get off the vehicle 10, as in the following flowchart.

The sitting position specifying unit 105 specifies, as the sitting position of the user 2 who gets off the vehicle 10 next at the destination of the user 2, a sitting position that is registered in the memory 102 in association with the destination of the user 2 in advance by the sitting position registration unit 104 (step S501).

Next, the door selection unit 106 selects the boarding and alighting door via which the user 2 gets off the vehicle 10 based on the sitting position of the user 2 specified by the sitting position specifying unit 105 (step S502).

Figure 6:
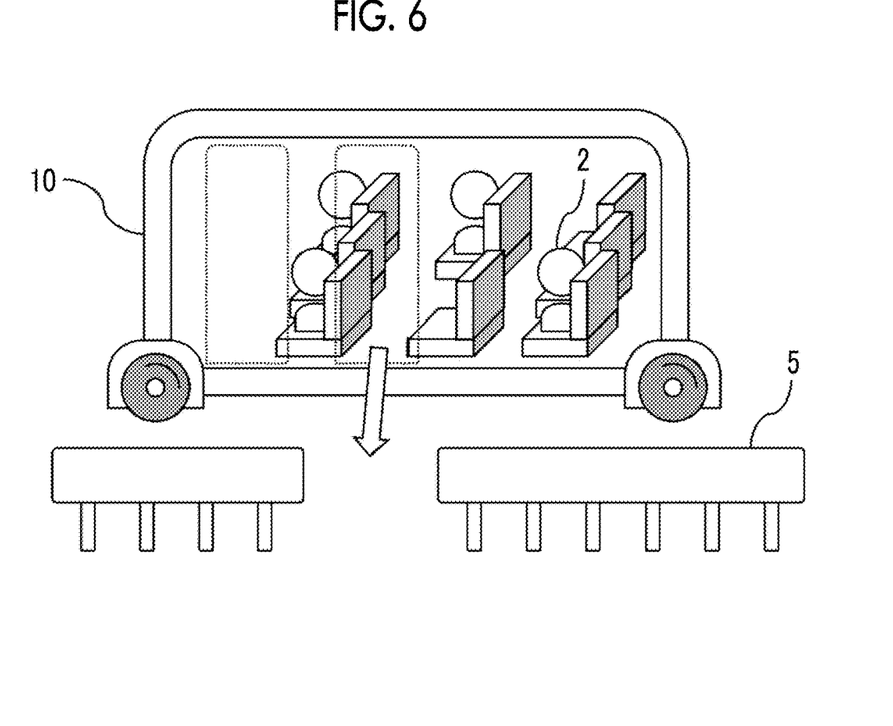
FIG. 6 is a view schematically illustrating the user getting off the vehicle stopped at the destination of the user.
Figure 7:
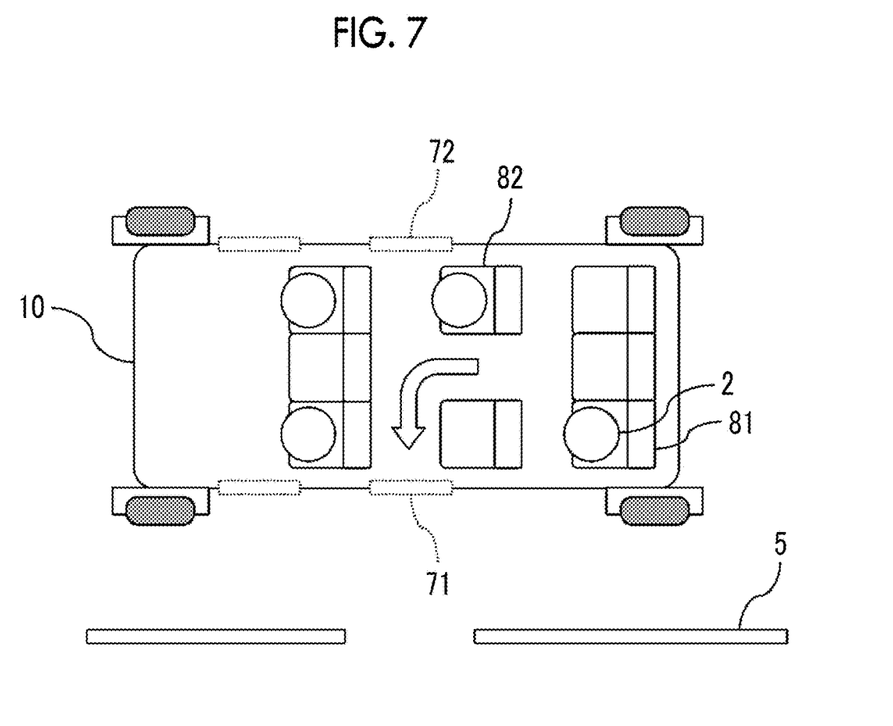
FIG. 7 is a view schematically illustrating the user getting off the vehicle stopped at the destination of the user.

For example, FIGS. 6 and 7 are views schematically illustrating the user 2 getting off the vehicle 10 stopped at the destination of the user 2. FIG. 6 illustrates the vehicle 10 as seen in a lateral direction and FIG. 7 illustrates the arrangement of the sitting positions in the vehicle 10 and the doors. Note that, although the sheets in the vehicle 10 illustrated in FIGS. 6 and 7 are disposed to face the proceeding direction of the vehicle 10, the sheets in the vehicle 10 may not be disposed in this manner and may be disposed to face a lateral direction with respect to the proceeding direction of the vehicle 10.

In FIGS. 6 and 7, the user 2 who gets off the vehicle 10 is seated on a sitting position 81 which is on a left side of a sheet for three persons in the rearmost row in the vehicle 10. The user 2 seated on the sitting position 81 can use a door 71 or a door 72 of the vehicle 10 to get off the vehicle 10 and the door 71 is closest to the sitting position 81 from among the door 71 and the door 72. Therefore, for the user 2, the easiest way for getting off the vehicle 10 is to use the door 71.

When the user 2 seated on the sitting position 81 wants to use the door 72 other than the door 71, the user 2 needs to ask another user, who is seated on a sitting position 82 present on a route from the sitting position 81 to the door 72, to move out of the route to the door 72. In this viewpoint also, for the user 2, the easiest way for getting off the vehicle 10 is to use the door 71.

Therefore, in the case of the arrangement of the sitting positions in the vehicle 10 and the doors as shown in FIGS. 6 and 7, the door selection unit 106 selects the door 71 via which the user 2 most easily gets off the vehicle 10 as the boarding and alighting door via which the user 2 gets off the vehicle.

For that purpose, the door selection unit 106 specifies the boarding and alighting door corresponding to the sitting position while referring to the table showing the correspondence relationship between each sitting position in the vehicle 10 and a door that is used when a user on the sitting position gets on or off the vehicle 10, which is stored in the memory 102 in advance, for example. For example, the door selection unit 106 selects, as the boarding and alighting door, a door of the vehicle 10 that is closest from the sitting position of the user 2.

In addition, the door selection unit 106 may select the boarding and alighting door based on whether there is a sitting position in a seated state other than the sitting position of the user 2 or not. For example, as shown in FIGS. 6 and 7, the door selection unit 106 may not select, as the boarding and alighting door, the door 72 positioned with another sitting position 82 in a seated state present on a route thereto from the sitting position 81 of the user 2, if possible.

For that purpose, first, the door selection unit 106 specifies another sitting position present on a route from the sitting position of the user 2 to each door of the vehicle 10 by referring to the information showing another sitting position present on a route from each sitting position in the vehicle 10 to each door of the vehicle 10, which is included in the table stored in the memory 102 in advance, for example. Next, the door selection unit 106 determines whether the other sitting position present on the route from the sitting position of the user 2 to each door of the vehicle 10 is in a seated state or not by means of the sitting sensor 14.

In addition, the door selection unit 106 selects, as the boarding and alighting door, a door of the vehicle 10 that is closest to the sitting position of the user 2 from among all of the doors of the vehicle 10 except a door that is positioned with another sitting position in a seated state present on a route thereto from the sitting position of the user 2. For that purpose, the door selection unit 106 may refer to the information showing the ascending order of distances from the sitting position of the user 2 to doors available from the sitting position, which is included in the above-described table stored in the memory 102 in advance. In a case where other sitting positions in a seated state are present on all of the routes from the sitting position of the user 2 to the doors of the vehicle 10, the door selection unit 106 selects, as the boarding and alighting door, a door of the vehicle 10 that is closest to the sitting position of the user 2 from among all of the doors of the vehicle 10.

In addition, in a case where the destination of the user 2 is on a two-way road, the door selection unit 106 may select a door on a side (left side in case of left-hand traffic) opposite to an opposing lane side of the road as the boarding and alighting door. The door selection unit 106 may be able to select, as the boarding and alighting door, a door of the vehicle 10 that is on the opposing lane side (right side in case of left-hand traffic) of the road in a case where the destination of the user 2 is on a one-way road or on a parking lot.

Next, the stopping position determination unit 107 determines the stopping position of the vehicle 10, at which the user 2 gets off the vehicle via the boarding and alighting door, corresponding to the position of the boarding and alighting door (step S503). For example, as shown in FIGS. 6 and 7, the stopping position determination unit 107 determines a gap between guardrails 5 as the stopping position such that an obstacle such as a guardrail that inhibits the user 2 from getting off the vehicle 10 is not present within a certain area (within radius of two meters) outward of the boarding and alighting door of the vehicle 10.

For that purpose, the stopping position determination unit 107 can refer to the map data stored in the memory 102 in advance. For example, when the vehicle 10 arrives at the destination, the stopping position determination unit 107 detects a predetermined obstacle such as a guardrail or an electric pole present within the certain area around the destination of the user 2 by referring to the map data. Then, the stopping position determination unit 107 determines, as the stopping position of the vehicle 10, the position of the vehicle 10 in a map at which coordinates of the detected obstacle are not within the certain area outward of the boarding and alighting door of the vehicle 10.

Alternatively, the stopping position determination unit 107 may detect the predetermined obstacle present at the destination by using the out-of-vehicle camera 11 installed in the vehicle 10. For example, the stopping position determination unit 107 can use a machine learning technique to detect the predetermined obstacle present around the vehicle 10. Specifically, the stopping position determination unit 107 can use a detector based on a deep neural network (DNN) or the like that is caused to learn to detect the predetermined obstacle from an image included in the video obtained by the out-of-vehicle camera 11 in advance. For example, when the vehicle 10 arrives at the destination, the stopping position determination unit 107 inputs an image included in a video of the vicinity of the vehicle 10, which is captured by the out-of-vehicle camera 11 of the vehicle 10, to the detector and detects the predetermined obstacle output from the detector as the predetermined obstacle present around the vehicle 10 at the destination.

Then, the stopping position determination unit 107 obtains the position of the detected obstacle in a real space according to a projection transformation formula obtaining the coordinates of an object around the vehicle 10 in the rear space from the coordinates of the object in the image included in the video captured by the out-of-vehicle camera 11. The projection transformation formula is determined based on, for example, the installation position and the installation angle of the out-of-vehicle camera 11 and internal parameters such as the focal length of the out-of-vehicle camera 11. The, the stopping position determination unit 107 determines, as the stopping position of the vehicle 10, the position of the vehicle 10 at which the position of the detected obstacle in the real space is not within the certain area outward of the boarding and alighting door of the vehicle 10.

In addition, the stopping position determination unit 107 may determine, based on information about the traffic volume of a road within a certain area around the destination of the user 2 which is received via a traffic information receiver (not shown) installed in the vehicle 10, a position with a predetermined traffic volume or less as the stopping position. The traffic information receiver is, for example, a car navigation system configured to be able to receive traffic information such as vehicle information and communication system (VICS) information.

In addition, in a case where the user 2 gets off the vehicle 10 during a predetermined period of time such as nighttime between sunset and sunrise, the stopping position determination unit 107 may determine, as the stopping position, a position within a predetermined area (for example, within radius of five meters) around a position at which predetermined lighting equipment such as a street light or a billboard light is present.

For that purpose, the stopping position determination unit 107 can refer to the map data stored in the memory 102 in advance. For example, when the vehicle 10 arrives at the destination, the stopping position determination unit 107 detects the predetermined lighting equipment present within a certain area around the destination of the user 2 by referring to the map data. Then, in a case where a current time is within the predetermined period of time, the stopping position determination unit 107 determines a position within the predetermined area around the detected lighting equipment as the stopping position.

Note that, the stopping position determination unit 107 may determine the stopping position of the vehicle 10 by combining two or more of the above-described plurality of methods of determining the stopping position of the vehicle 10.

Next, the driving controller 108 performs the automatic driving control of the vehicle 10 while referring to information about the current location of the vehicle 10 acquired from the position measurement sensor 13 such that the vehicle 10 is stopped at the stopping position determined by the stopping position determination unit 107 (step S504). For that purpose, as with a case of detecting a predetermined obstacle as described above, the driving controller 108 can detect an object and a person around the vehicle 10 from an image included in a video of the object and the person around the vehicle 10 which is captured by the out-of-vehicle camera 11 by using a detector that is caused to learn to detect an object and a person from an image included in the video obtained by the out-of-vehicle camera 11 in advance, for example. The driving controller 108 measures distances to the object and the person detected around the vehicle 10 by using, for example, the distance measurement sensor 12 and performs the automatic driving control of the vehicle 10 such that the vehicle 10 does not come into contact with the object and the person and the vehicle 10 is stopped at the determined stopping position.

Thereafter, a door controller (not shown) of the ECU 17 opens and closes the boarding and alighting door via the door control device 15 after notifying the user 2 of the boarding and alighting door by causing a lamp installed in the boarding and alighting door determined by the stopping position determination unit 107 to flicker or like (step S505).

As described above, the stopping position control device according to the embodiment determines, based on a sitting position of a user who gets off a vehicle next, a stopping position of the vehicle such that the user easily gets off the vehicle, the vehicle being subjected to automatic driving control.

Accordingly, the stopping position control device according to the embodiment can make it easy for a user to get off a vehicle.

The embodiment is merely a specific example of implementations of the disclosure and should not be interpreted as limiting the technical scope of the disclosure. In other words, various implementations are possible without departing from the technical idea or main features of the disclosure.

According to a modification example, an in-vehicle camera (not shown) installed in the vehicle 10 may be used to detect whether each sitting position in the vehicle 10 is in a seated state or not instead of the sitting sensor 14.

For example, the sitting position registration unit 104 or the sitting position specifying unit 105 can use a machine learning technique to detect whether each sitting position in the vehicle 10 is in a seated state or not. Specifically, the sitting position registration unit 104 or the sitting position specifying unit 105 can use a detector based on a DNN or the like that is caused to learn to detect the user 2 from an image included in a video obtained by the in-vehicle camera in advance. The sitting position registration unit 104 or the sitting position specifying unit 105 can input an image included in a video obtained by the in-vehicle camera to the detector and in a case where the position of the user 2 in the image which is output from the detector overlaps with any of the sitting positions in the image, the sitting position registration unit 104 or the sitting position specifying unit 105 can determine that the sitting position is in a seated state.

Note that, in a case where a plurality of users 2 gets on the vehicle 10 at the same time at the same boarding place, it may be difficult for the sitting position registration unit 104 or the sitting position specifying unit 105 to specify which user 2 has sat on which sitting position by using the sitting sensor 14 of the vehicle 10 solely. In such a case, the sitting position registration unit 104 or the sitting position specifying unit 105 can specify the sitting positions of the users 2 getting on the vehicle 10 by using a portable terminal charger as well which is provided for each of the sitting positions in the vehicle 10 and that can charge the portable terminal 30.

Specifically, when the portable terminal 30 of the user 2 is connected to a portable terminal charger, the portable terminal charger communicates with the portable terminal 30 by using short-range wireless communication such as Bluetooth (registered trademark) or by using a communication cable, a communication connector, or the like through which electric power can be supplied and receives information about information for identification of the user 2 such as the identification number of the user 2 or the identification number of the portable terminal 30 from the portable terminal 30. Then, the portable terminal charger outputs information for identification of the user 2, which is received from the portable terminal 30, to the ECU 17 along with the machine number of the portable terminal charger.

Accordingly, the sitting position registration unit 104 or the sitting position specifying unit 105 can specify the user 2 whose portable terminal 30 is connected to the portable terminal charger by comparing the information for identification of the user 2 which is received from the portable terminal 30 via the portable terminal charger with information for identification of the user 2 which is received from the portable terminal 30 in advance via the server 20. In addition, the sitting position registration unit 104 or the sitting position specifying unit 105 can specify a sitting position provided with the portable terminal charge by referring to a table showing a correspondence relationship between the machine numbers of the portable terminal chargers and the sitting positions provided with the portable terminal chargers, which is stored in the memory 102 in advance, for example. Accordingly, the sitting position registration unit 104 or the sitting position specifying unit 105 can specify which user 2 has sat on which sitting position even in a case where the users 2 get on the vehicle 10 at the same time.

Such a portable terminal charger may be, for example, a USB hub conforming to the universal serial bus (USB) standard. Alternatively, the portable terminal charger may be a non-contact charging device that wirelessly supplies electric power to the portable terminal 30 near the portable terminal charger.

In addition, according to another modification example, the stopping position control device can make it easy for the user 2 to get off the vehicle 10 and also can make it easy for the user 2 to get on the vehicle 10.

In the other modification example as well, the processor 103 may perform the same processes as the sitting position registration unit 104, the sitting position specifying unit 105, the door selection unit 106, the stopping position determination unit 107, and the driving controller 108.

At that time, the sitting position specifying unit 105 of a stopping position control device according to the other modification example specifies any of sitting positions on which other users are not seated as a sitting position on which the user 2 who gets on the vehicle 10 next sits. In addition, the door selection unit 106 selects the boarding and alighting door at which the user 2 gets on the vehicle 10 based on the sitting position of the user 2. In addition, the stopping position determination unit 107 determines the stopping position corresponding to the position of the boarding and alighting door. In addition, the driving controller 108 performs the automatic driving control of the vehicle 10 such that the vehicle 10 is stopped at the determined stopping position. Accordingly, the user 2 easily gets on the vehicle 10.

In addition, according to still another modification example, the stopping position control device can be configured as the server 20 including a communication unit configured to be able to communicate with the vehicle 10 via the network 3 instead of being configured as an in-vehicle device installed in the vehicle 10.

A processor of the server 20 may perform the same processes as the sitting position registration unit 104, the sitting position specifying unit 105, the door selection unit 106, the stopping position determination unit 107, and the driving controller 108 of the processor 103 of the ECU 17 in the above-described embodiment and the above-described modification examples.

The server 20 includes the communication unit for connection to the network 3 via a gateway or the like and is configured to be able to communicate with the vehicle 10 and the portable terminal 30 of the user 2 via the network 3 at this time. The server 20 receives sitting information indicating whether each sitting position in the vehicle 10 is in a seated state or not from the vehicle 10 via the communication unit. In addition, the server 20 transmits the determined stopping position of the vehicle 10 to the vehicle 10 via the communication unit. Accordingly, the vehicle 10 is stopped at the stopping position and thus the user 2 easily gets off the vehicle 10.

As described above, those skilled in the art can make various modifications in accordance with the embodiment without departing the scope of the disclosure.

The invention claimed is:

1. A stopping position control device comprising:
 a processor configured to:
  determine a sitting position of a user within a vehicle who is scheduled to exit the vehicle next, the vehicle being subjected to automatic driving control and the vehicle including a first door and a second door;
  select, based on the sitting position of the user, one of the first door and the second door at which the user is scheduled to exit the vehicle next based upon which of the first door and the second door is closest to the sitting position of the user;
  select a stopping position of the vehicle based upon the selected first door or second door; and
  cause the vehicle to stop at the selected stopping position.

2. The stopping position control device according to claim 1, further comprising:
 a storage unit configured to store information about a boarding place at which the user gets on the vehicle and a destination at which the user is scheduled to exit the vehicle,
 wherein the processor is further configured to:
  register the sitting position as a seated state when the user gets on the vehicle at the boarding place of the user in the storage unit in association with the destination of the user; and
  specify, as the sitting position of the user who is scheduled to exit the vehicle at the destination of the user, the sitting position that is registered in the storage unit in association with the destination of the user.

3. The stopping position control device according to claim 1, wherein the processor is further configured to determine, as the stopping position, a position at which no obstacle inhibiting the user from getting off the vehicle through the selected first door or second door is present within a certain area outward of the selected door of the vehicle.

4. The stopping position control device according to claim 3, wherein the processor is further configured to determine the stopping position based on map data including information about a position of an obstacle present within a certain area around a destination of the user.

5. The stopping position control device according to claim 1, wherein the processor is further configured to determine, based on map data including information about a position of predetermined lighting equipment present within a certain area around a destination of the user, a position within a predetermined area around the position of the predetermined lighting equipment as the stopping position in a case where the user is scheduled to exit the vehicle during a predetermined period of time.

6. The stopping position control device according to claim 1, wherein the processor is further configured to determine, based on information about a traffic volume of a road within a certain area around a destination of the user which is received from a traffic information receiver, a position with a predetermined traffic volume or less as the stopping position.

7. A stopping position control method comprising:
- determining a sitting position of a user within a vehicle who is scheduled to exit the vehicle next, the vehicle being subjected to automatic driving control and the vehicle including a first door and a second door;
- selecting, based on the sitting position of the user, one of the first door and the second door at which the user is scheduled to exit the vehicle next based upon which of the first door and the second door is closest to the sitting position of the user;
- selecting a stopping position of the vehicle based upon the selected first door or second door; and
- causing the vehicle to stop at the selected stopping position.

8. A computer program for stopping position control, the computer program causing a processor to:
- determine a sitting position of a user within a vehicle who is scheduled to exit the vehicle next, the vehicle being subjected to automatic driving control and the vehicle including a first door and a second door;
- select, based on the sitting position of the user, one of the first door and the second door at which the user is scheduled to exit the vehicle next based upon which of the first door and the second door is closest to the sitting position of the user;
- select a stopping position of the vehicle based upon the selected first door or second door; and
- causing the vehicle to stop at the selected stopping position.

9. A stopping position control device comprising:
a processor configured to:
- specify a sitting position on which a user who gets on a vehicle next sits, the vehicle being subjected to automatic driving control and the vehicle including a first door and a second door;
- select, based on the sitting position of the user, one of the first door and the second door at which the user is scheduled to exit the vehicle based upon which of the first door and the second door is closest to the sitting position of the user;
- select a stopping position of the vehicle based upon the selected first door or second door; and
- causing the vehicle to stop at the selected stopping position.

* * * * *